United States Patent [19]
Capucci

[11] Patent Number: 5,989,138
[45] Date of Patent: Nov. 23, 1999

[54] TENSIONER WITH ADJUSTABLE SNUBBER

[75] Inventor: Germinal Flavio Capucci, Carnate, Italy

[73] Assignee: Morse TEC Europe S.p.A., Italy

[21] Appl. No.: 09/070,294

[22] Filed: Apr. 30, 1998

[30] Foreign Application Priority Data

Jul. 14, 1997 [EP] European Pat. Off. .............. 97830349

[51] Int. Cl.$^6$ ................ F16H 7/08; F16H 7/22; F16H 7/18
[52] U.S. Cl. .............. 474/109; 474/111; 474/140
[58] Field of Search .................. 474/101, 109, 474/111, 140

[56] References Cited

U.S. PATENT DOCUMENTS

| | | | |
|---|---|---|---|
| 3,276,282 | 10/1966 | Duncan ........................ | 74/242 |
| 3,463,025 | 8/1969 | Turner et al. ................ | 74/242 |
| 3,490,302 | 1/1970 | Turner et al. ................ | 74/242 |
| 4,921,472 | 5/1990 | Young ........................ | 474/111 |
| 5,055,088 | 10/1991 | Cradduck et al. .......... | 474/111 |
| 5,180,340 | 1/1993 | Vahabzadeh et al. ...... | 474/111 |
| 5,184,982 | 2/1993 | Shimaya et al. ........... | 474/111 |
| 5,266,066 | 11/1993 | White ........................ | 474/111 |
| 5,286,234 | 2/1994 | Young ........................ | 474/111 |
| 5,425,680 | 6/1995 | Young ........................ | 474/111 |
| 5,462,493 | 10/1995 | Simpson .................... | 474/111 |
| 5,647,811 | 7/1997 | Mott .......................... | 474/111 |
| 5,776,024 | 7/1998 | White et al. ............... | 474/111 |
| 5,846,150 | 12/1998 | Wigsten ..................... | 474/111 |
| 5,868,638 | 2/1999 | Inoue et al. ............... | 474/111 |

FOREIGN PATENT DOCUMENTS

| | | |
|---|---|---|
| 0-113-685 | 7/1984 | European Pat. Off. . |
| 1-190-167 | 10/1959 | France . |
| 1492846 | 11/1967 | France . |
| 24-45-286 | 4/1976 | Germany . |
| 196-50-289 | 6/1997 | Germany . |
| 57-134054 | 8/1982 | Japan . |
| 57-134055 | 8/1982 | Japan . |
| 353797 | 7/1931 | United Kingdom . |
| 505746 | 5/1939 | United Kingdom . |
| 907983 | 10/1962 | United Kingdom . |

OTHER PUBLICATIONS

European Search Report No. EP 97 83 0349 –Dec. 10, 1997.

*Primary Examiner*—Tamara L. Graysay
*Assistant Examiner*—Matthew A. Kaness
*Attorney, Agent, or Firm*—Sidley & Austin; Greg Dziegielewski

[57] ABSTRACT

In a chain drive system, initial calibration or adjustment for take-up or compensation of the manufacturing and assembly tolerances is achieved by an adjustment device that comprises a fixed block (12) and a spring-loaded moveable pad or snubber member (14), which, after initial positioning for take-up of tolerances, is fixed in position on the body. The adjustment device(10) can generally be positioned on the tight portion of the chain and can be an independent device or it can be combined with a traditional hydraulic or mechanical tensioner for taking up slack due to wear.

11 Claims, 3 Drawing Sheets

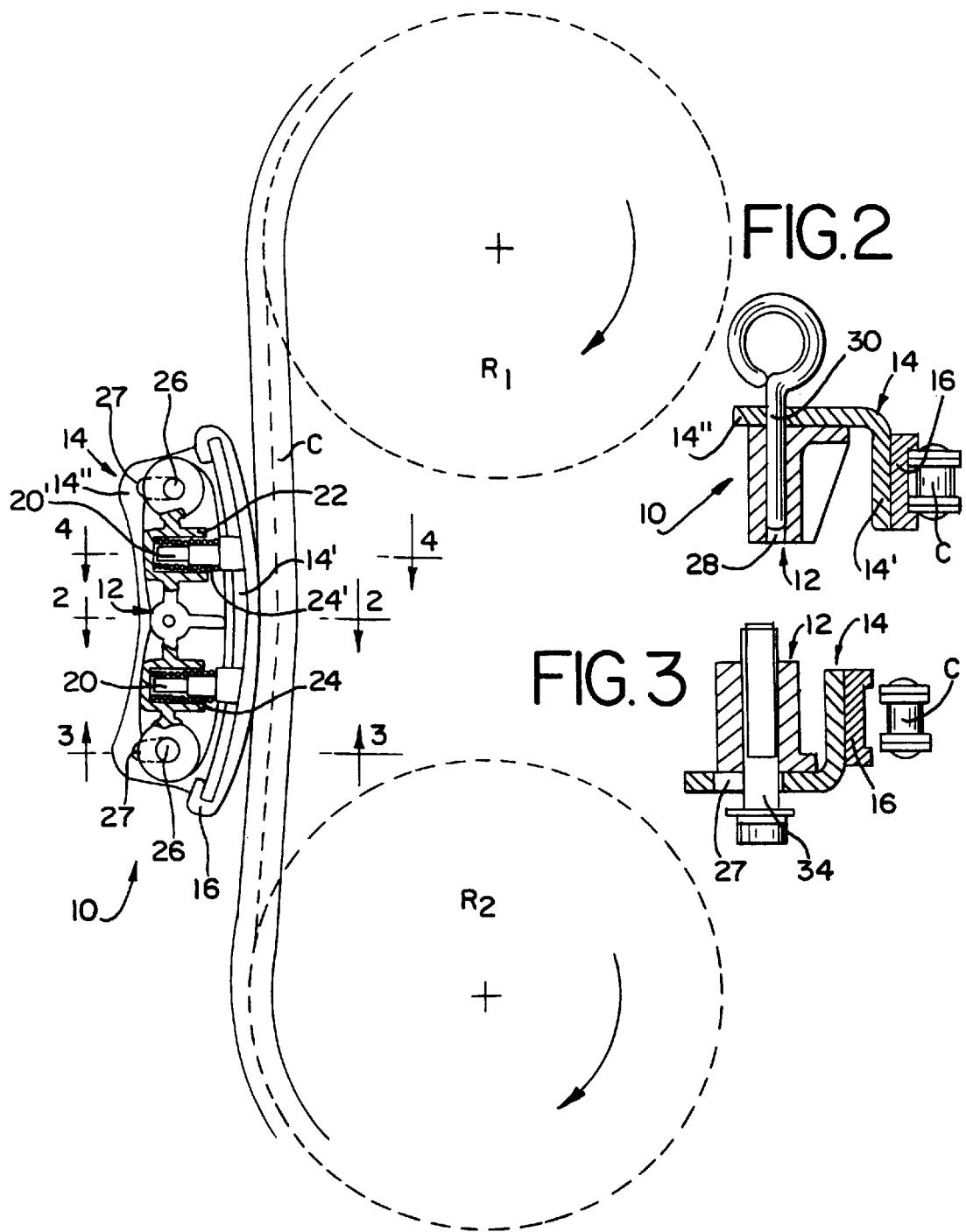

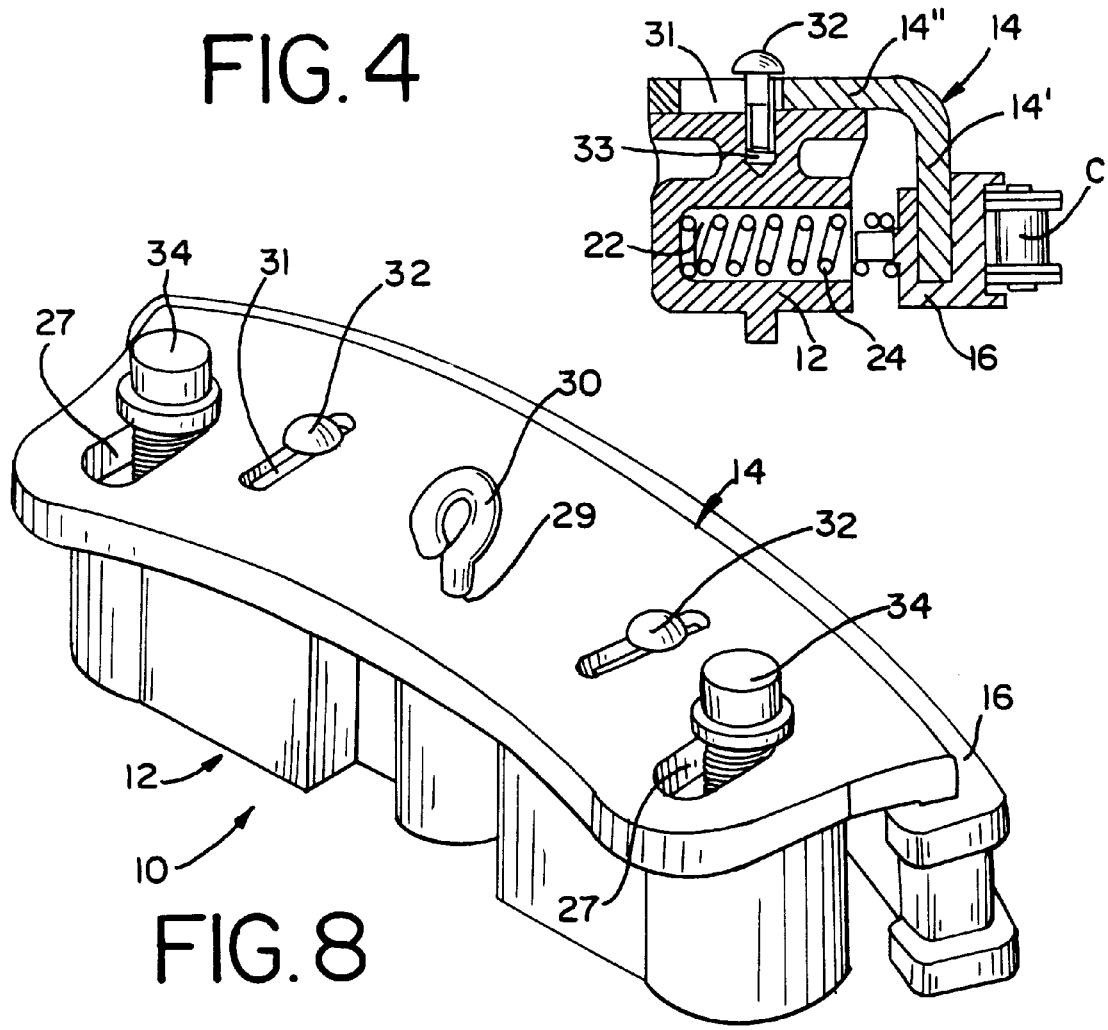
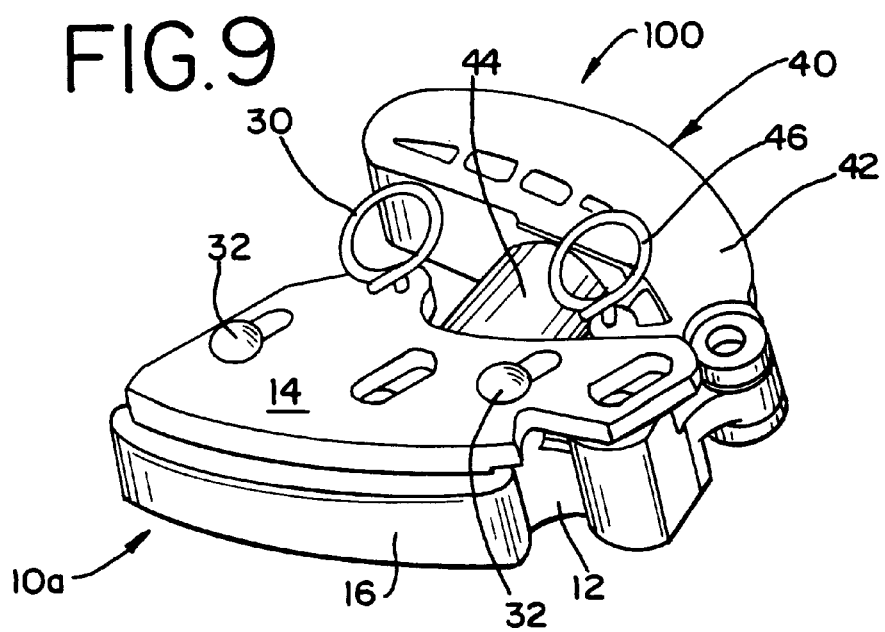

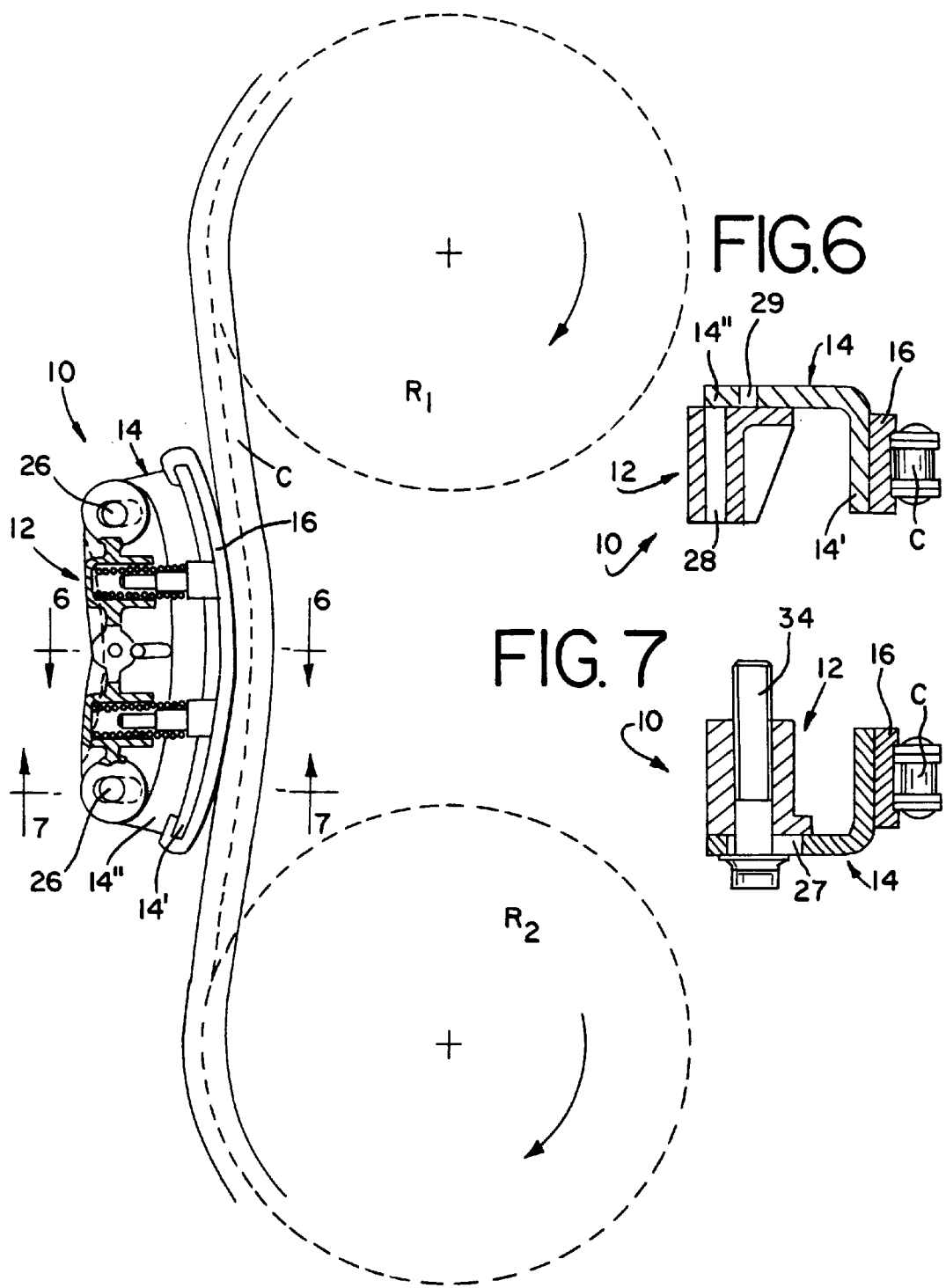

TENSIONER WITH ADJUSTABLE SNUBBER

BACKGROUND OF THE INVENTION

The present invention relates to a tensioning device for a power transmission chain system. More particularly, the present invention relates to a tensioning device having an adjustable snubber for eliminating the decrease in chain tension on the tight side of a chain system caused by manufacturing tolerances in the chain components.

Power transmission chain systems for automotive applications typically include at least two sprockets and an endless chain wrapped around the sprockets. As the driving sprocket transmits power to the chain, which then transmits power to the driven sprocket, a tight side and a slack side of the chain is formed in the span or length of chain between the sprockets.

In a chain drive system, a tensioning device is generally provided for taking-up or compensating for looseness on the slack side of the chain. The slack take-up device, or tensioner, is generally in one of two categories: a hydraulic tensioner made up of a hydraulic cylinder piston assembly which carries on its moveable member a tensioner arm or pad designed to contact the chain and resist inward movement of the chain by spring and hydraulic pressure; a mechanical tensioner which, on the other hand, exploits the action of a helical or leaf spring that causes the tensioner arm or chain guide to move outward and eliminate slack in the chain.

The tensioner device takes up both the slack due to the wear of the chain and the sprockets, and the slack or the tolerances due to any initial errors in assembly. As a result, however, the moveable member of the tensioner, in order to have a desired effect, must have a considerable range of movement. Another result is that sometimes an initial adjustment, or a take-up of initial assembly tolerances, when they are significant, jeopardizes the possibility of compensating wear during the later stages of the life of the chain, in that the range of movement of the tensioner arm is largely or completely utilized in initial adjustment for tolerances.

Furthermore, the known systems generally have a fixed chain guide or snubber on the tight strand of the chain. In view of the limited slack on the tight strand of the chain, the snubber or chain guide typically does not expand outward to take up the slack in the chain. Thus, the snubber does not provide an outward movement to take up the slack due to manufacturing tolerances.

There is therefore the need in the chain art to obtain a satisfactory take-up of slack, whether due to assembly or manufacturing tolerances inherent in the system, or due to the wear between the parts that occurs with time.

The device of the present invention is directed to that problem.

SUMMARY OF THE INVENTION

In one embodiment, the adjustment device of the present invention comprises a fixed body or block and a shoe or pad ("snubber") that is adjustable in position thereon. The block is fixed at a position near a tight portion of the drive chain, and the snubber or pad is pushed into an extended condition by the action of springs and can be locked in position by means of screws. A locking means is preferably provided to lock the shoe with the block in a retracted condition thereof, for transportation and storage.

The overall chain system comprises such an adjustment device with a pad on one or more tight sides of the drive chain. The system uses the adjustment device together with a hydraulic or mechanical tensioner on the slack or loose side of the chain. In one embodiment, a tolerance compensation device and a hydraulic tensioner are mounted on a single block.

The new device and system, relying on different means for initial compensation of assembly tolerances and take-up of slack due to wear, respectively, allows to have a chain drive that is always tight for a greater length of time than traditional systems.

BRIEF DESCRIPTION OF THE DRAWINGS

An unrestrictive exemplary embodiment of the invention will be described below with reference to the attached drawings, in which:

FIG. 1 shows a partial sectional side view, of an adjustment device according to the invention in a retracted condition, with a chain of a drive chain, shown in a broken-away view;

FIG. 2 is an enlarged sectional view taken along line 2—2 in FIG. 1;

FIG. 3 is an enlarged sectional view taken along line 3—3 in FIG. 1;

FIG. 4 is an enlarged sectional view taken along line 4—4 in FIG. 1;

FIG. 5 is a similar to FIG. 1, but shows the device of the invention in an extended working position;

FIG. 6 is a sectional view taken along line 6—6 in FIG. 5;

FIG. 7 is a sectional view taken along line 7—7 in FIG. 5;

FIG. 8 is a perspective view of the adjustment device of the present invention;

FIG. 9 is a perspective view showing a modified embodiment of the adjustment device combined with a conventional hydraulic tensioner, for compensating or taking up slack due to wear.

DETAILED DESCRIPTION OF THE PREFERRED EMBODIMENTS

An adjustment device 10 according to this invention comprises a fixed portion or block 12 and a moveable portion or pad or snubber member 14. The moveable snubber member 14 is L-shaped in cross-section with the side portion extending downward for attachment to the block. The snubber member carries a band or strip of anti-friction material on a leg 14' of the L. The portion 14' is integral with two guide stems 20, 20'.

The block 12 has two housings or receptacles 22 that are parallel to one another. The receptacles receive the two stems 20, 20' with a pressure spring 24, 24' interposed between each stem and each housing. The springs 24, 24' bias the stems outward from the receptacles 20, 20', respectively. The block 12 also has smooth apertures or holes 26 to accommodate screws for fixing the block to a base. The holes each have an axis at right angles to the axes of the housings 22. One aperture has a seat 28 for holding a retaining pin 30. The leg 14" of the snubber is made with elongated slots 27, which coincide with the holes 26, and with aperture or through hole 29, which coincides with the hole 28. The axes of the slots 27 are substantially parallel to the axes of each of the housings 22. Additional elongated slots 31, 32 in the portion 14" of the snubber have their axes parallel to the axes of the slots 27 and are positioned to coincide with the holes 33 in the body. "Self-threading" rivets or nails 31, i.e., holding members that are provided with retaining projections on their stems, are inserted with the stems engaged in the holes 33.

During storage and transportation, the moveable portion of the adjustment member is retained in the retracted position (FIGS. 1, 2, 3, 4) with the stems 24, 24' inside their respective housings 22 and held against the action of the springs 24. The retracted position is fixed by means of a retaining pin 30, inserted in the holes 28 and 29. In this condition, the rivets 32 are engaged in the holes 33 to permit some play or movement between the head of the rivet and the surface of the snubber.

The adjustment device is installed, as will be described below, on a tight side of a drive chain C between two sprockets $R_1$ and $R_2$. The tight side of the chain is the span in tension between the driving and driven sprockets to permit power transmission. After the fixed block 12 has been secured or fixed in position by threading the anchoring screws 34 into the block through the holes 26, the stop 30 is removed or pulled out of the block. The springs 24 act to bias or press the snubber member 14 outward against the chain C, which results in the further tightening or taking-up of the slack in the chain in the tight strand due to manufacturing and assembly tolerances. The snubber 14 slides along the block until the chain is tightened, the extent of which varies according to the slack to be taken up. The extended condition is shown in FIG. 5. The block 12 and the snubber 14 are then fixed or held in their respective, extended positions by applying screws 34 and inserting or threading them until they lock. This adjustment operation is generally done only upon installation of the system, after which the device 10 behaves like any other fixed shoe or "snubber" of the prior art. As an alternative, screws can be used instead of the rivets 32, and the holes 33 can be threaded.

With reference to FIG. 9, a modified embodiment of the invention will now be described, in which an assembly 100 comprising an adjustment device of the present invention and a conventional tensioner device of the prior art are combined with each other, for the same chain drive. The adjustment device 10a comprises the same parts described above with reference to the preceding figures, and therefore will not be described in detail. In particular the block 12, on which the snubber 14 with the anti-friction strip 16 can slide for a limited stroke, is shown. The snubber is shown in the retracted condition, retained by the ring stop 30.

A hydraulic tensioner 40, for counteracting the slack due to wear in the chain system, includes a conventional tensioner arm 42 and a thrust cylinder-piston 44. The device will not be described in further detail in that it is well known in the art. It also is illustrated in the retracted condition for transportation and storage, retained by a ring stop 46.

What is claimed is:

1. An adjustable snubber device for reduction of the spacing between parts from manufacturing and assembly tolerances in a chain drive system, comprising:

a block (12) having an axial length;

a snubber member (14) on said block, said snubber member being slidable on said block for a distance in a direction transverse to said axial length between a retracted condition and an extended condition, said snubber member having an engaging member for contacting the chain, said engaging member extending along said snubber member for a distance of said axial length of said block;

a plurality of spring members (24) located along a portion of the axial length of said block, said spring members acting between said block and said snubber member to urge said snubber member in said transverse direction to said extended condition.

2. The device according to claim 1, further comprising locking members (28,29,30) to retain said snubber member in said retracted condition on said block.

3. The device according to claim 2, wherein said locking members include a stop(30), a first hole(28) in said block and a second hole(29) in said snubber member, said first and second holes being aligned when said snubber member is in the retracted condition on the block.

4. The device according to claim 1, further comprising fixing members (31,33,32) to retain said snubber member in said extended condition on said block.

5. The device according to claim 4, wherein said fixing members include a hole(33) in the block, an elongated slot(31) in the snubber member and a holding member that can be locked in the hole(33), said holding member having a head protruding from the slot.

6. The device according to claim 5 wherein said holding member further comprises a rivet.

7. The device according to claim 5 wherein said holding member further comprises a screw.

8. The device according to claim 1, further comprising an aperture (26) in the block, a slot (27) in the pad, and anchoring screws(34) for fixing to a base, said screws having a stem whose diameter does not exceed the diameter of the hole in the block.

9. The device according to claim 1, further comprising guide stems (20) integral with the pad, said stems cooperating with seats (20) in the block (C).

10. The device according to claim 1 wherein said adjustment device is positioned along a chain strand between pair of sprockets ($R_1$ and $R_2$), said chain strand having a slack portion and one or more tight portions thereof, said adjustment device(10) being extendable for reduction of the spacing between parts from manufacturing and assembly tolerances on at least one said tight portion of the chain, said chain system including a tensioner device (40) to take up slack due to wear on one or more slack portions of the chain.

11. The device according to claim 10, wherein said adjustment device (10) is linked with said tensioner device (40).

* * * * *